United States Patent [19]
Boyd

[11] Patent Number: 5,868,103
[45] Date of Patent: Feb. 9, 1999

[54] METHOD AND APPARATUS FOR CONTROLLING AN ANIMAL

[75] Inventor: Randal D. Boyd, Knoxville, Tenn.

[73] Assignee: Radio Systems Corporation, Knoxville, Tenn.

[21] Appl. No.: 902,730

[22] Filed: Jul. 30, 1997

[51] Int. Cl.$^6$ ............................................. A01K 15/00
[52] U.S. Cl. .................... 119/719; 119/720; 119/859; 119/908
[58] Field of Search .................... 119/719, 720, 119/721, 859, 860, 908

[56] References Cited

U.S. PATENT DOCUMENTS

| | | |
|---|---|---|
| 3,753,421 | 8/1973 | Peck . |
| 4,627,385 | 12/1986 | Vinci .................................. 119/908 X |
| 4,652,261 | 3/1987 | Mech et al. ......................... 119/859 X |
| 4,898,120 | 2/1990 | Brose .................................. 340/573 X |
| 5,067,441 | 11/1991 | Weinstein ............................ 340/573 X |
| 5,381,129 | 1/1995 | Boardman ............................... 340/573 |

*Primary Examiner*—Robert P. Swiatek
*Attorney, Agent, or Firm*—Pitts & Brittian, P.C.

[57] ABSTRACT

An apparatus for controlling an animal wherein the animal receives a control stimulus of the release of a substance having an adverse effect upon the animal as a corrective measure. The apparatus includes a transmitter for producing a transmitted field, and a releasable collar for attaching to the neck of the animal. The collar includes a receiver for receiving the transmitted field and for producing a received signal, a control circuit for determining when the received signal indicates that the animal requires a corrective measure and for producing a control signal, a container for containing the substance having an adverse effect upon the animal, and a mechanism for releasing the substance from the container into the presence of the animal upon the production of the control signal by the control circuit. In use, the transmitter is set to produce the transmitted field and the collar is attached to the neck of the animal. As the animal moves about, the receiver in the collar receives the transmitted field and produces a received signal. The control circuit determines when the received signal indicates that the animal requires a corrective measure. A control signal is produced by the control circuit when the determination is made that the animal requires a corrective measure. Upon the production of the control signal, the substance having an adverse effect upon the animal is released from the container and into the presence of the animal.

21 Claims, 6 Drawing Sheets

METHOD AND APPARATUS FOR CONTROLLING AN ANIMAL

FIELD OF THE INVENTION

The present invention relates to methods and apparatus for controlling an animal. In particular, the present invention relates to those methods and apparatus which control the animal through the use of an attached collar to apply corrective measures to the animal.

BACKGROUND OF THE INVENTION

For the past twenty years, a number of systems have been developed to provide means for controlling pets. Many of these systems are used for the purpose of containing pets within a certain predefined area.

U.S. Pat. No. 3,753,421 to Peck discloses a system which uses a wire to define the boundary of the area to which the animal is to be restrained. In its most general use, the wire is laid out on the ground or buried a short distance beneath the surface of the ground and then connected to a transmitter system. The transmitter system sets up an electrical field in the wire which determines the boundary of the unit. The pet wears a collar which has a receiver and a stimulus system for providing a stimulus to the pet when the pet moves too close to the wire. Often, the collar contains two stimuli systems, one to give an audio warning to tell the pet that it is approaching the boundary and another to give a shock to further warn the pet that it is too close to the boundary.

This system has enjoyed some success but has a number of limitations in that it is rather expensive to obtain the amount of wire needed for a reasonable area and is time consuming or expensive to bury the amount of wire used. In addition if the pet is somehow able to go beyond the boundary wire, it will receive a stimulus to keep it away from the wire as it tries to re-enter the desired boundary area. Thus, there is no impetus for the pet to return to the desired area.

U.S. Pat. No. 4,989,120 to Brose sets forth a more sophisticated system in which the parameters of an area in which an animal is to be restrained are determined by evaluating a signal received by a central receiver sent from a transmitter on the animal. This central unit may then transmit a signal to a device worn by the animal to general a warning shock, sound or the like. This system enables a more sophisticated determination of the area in which the animal is free to roam and avoids the necessity for exposed wires about the parameter. However, such a system is cumbersome to use.

U.S. Pat. No. 5,067,441 to Weinstein also discloses a wireless system for restricting animals to a defined area. The system of Weinstein uses a transmitting system which generates radio signals to be located in or adjacent an area in which an animal is to be restrained. There is a unit adapted to be worn by the animal which receives the signals from the transmitting system. The collar system has a multiplicity of radio receivers each having a separate receiving antenna.

The system disclosed by Weinstein requires a complex evaluation of the orientation of the received radio signals. A vector summation is performed on those received signals to determine exactly where the animal is within a particular area. The system requires a large amount of power consumption in the receiver and, therefore, requires recharging or replacement of the battery in the collar every night.

U.S. Pat. No. 5,381,129 to Boardman discloses a wireless system for confining a pet to a predefined area. Like the Weinstein system described above, the system of Boardman uses a transmitting system which generates radio signals to be located in or adjacent an area in which an animal is to be restrained. There is a unit adapted to be worn by the animal which receives the signals from the transmitting system. The receiving unit comprises a phase locked loop for detecting the phase of the transmitted signal and a signal level detector for determining the signal level of the transmitted signal. When the level of the signal drops below a set level, a warning is given to the pet. When the phase locked loop loses the phase of the signal, the pet is given a correction such as a shock.

The Boardman system is simple and fairly effective but it is prone to the problems associated with radio signals. Often, nulls are generated in the area wherein the pet is to be restricted. Such nulls are created by reflections of the radio signal off walls, fences, trees, other pets and even people walking in the area. This could lead to the pet being given a warning or correction at an inappropriate location or time. It would be very difficult to train an animal under such conditions.

Each of these systems use an electric shock as a stimulus for correcting the behavior of the animal. Other related systems use high volumes of high pitched sounds as a stimulus. Despite the advantages of these systems, many pet owners do not like the use of an electric shock or high pitched sounds as a corrective measure.

In addition to the pet and animal containment applications, the control of animals also includes the training of animals by the use of remote devices which send a signal to the animal when the animal's behavior is either acceptable or unacceptable. Such training systems include those which use devices held by a trainer which transmit radio signals or ultrasonic signals to trigger a control stimulus (either pleasant or unpleasant) in a collar worn by the animal under training. Like the pet and animal containment applications, the unpleasant stimulus used is an electric shock or a high pitched sound. Thus, many animal and pet owners do not like to use these training systems.

Thus, there is a need for a pet control system which does not use an electric shock or high pitched sounds as a corrective measure. There is also a need for a pet control systems which is relatively simple to use by the consumer and does not use so much power as to inconveniently require frequent recharging or replacement of batteries in the pet's collar. Therefore, it is an object of the present invention to provide a pet control system which does not use an electric shock or high pitched sounds as a corrective measure.

It is also an object of the present invention to provide a pet control system which is relatively simple to use by the consumer.

It is yet another object of the present invention to provide a pet control system which does not use so much power as to inconveniently require frequent recharging or replacement of batteries in the pet's collar.

Consideration of the specification, including the several figures to follow will enable one skilled in the art to determine additional objects and advantages of the invention.

SUMMARY OF THE INVENTION

Having regard to the above and other objects and advantages, the present invention generally provides for an apparatus for controlling an animal wherein the animal receives a control stimulus of the release of a substance having an adverse effect upon the animal as a corrective measure. The apparatus comprises a transmitter for producing a transmitted field, and a releasable collar for attaching to the neck of the animal. The collar includes a receiver for receiving the transmitted field and for producing a received signal, a control circuit for determining when the received signal indicates that the animal requires a corrective measure and for producing a control signal, a container for containing the substance having an adverse effect upon the animal, and means for releasing the substance from the container into the presence of the animal upon the production of the control signal by the control circuit.

In the use of the present invention, the transmitter is set up to produce the transmitted field and the collar is attached to the neck of the animal. As the animal moves about, the receiver in the collar receives the transmitted field and produces a received signal. The control circuit, also in the collar, determines when the received signal indicates that the animal requires a corrective measure. A control signal is produced by the control circuit when the determination is made that the animal requires a corrective measure. Upon the production of the control signal, the substance having an adverse effect upon the animal is released from the container and into the presence of the animal.

In a preferred embodiment of the present invention, the transmitter produces an electromagnetic field and it is further preferred that the transmitter produces a magnetic field. When the transmitter produces an electromagnetic field, it is preferred that the transmitter includes an electromagnetic field generator, means for transmitting an electromagnetic field, and an electromagnetic field transmitting antenna. It is also preferred that the receiver includes an electromagnetic field receiving antenna, an electromagnetic field detector for detecting the presence of ate transmitted field, and a means for producing a received signal in response to the detected presence of the transmitted field. It is further preferred that the received signal is produced at a level that is directly related to the level of the received transmitted field and that the control circuit includes a comparator circuit for comparing the level of the received signal to a predetermined level, and means for producing a control signal when the level of the received signal is less than the predetermined level, or that the control circuit includes a comparator circuit for comparing the level of the received signal to a predetermined level, and means for producing a control signal when the level of the received signal is greater than the determined level. In addition, it is preferred that the control circuit includes means for producing a control signal when the received signal is present.

In another preferred embodiment of the present invention, the transmitter produces an ultrasonic field. In such an embodiment of the present invention, it is preferred that the transmitter includes an ultrasonic field generator, means for transmitting an ultrasonic field, and an ultrasonic field transmitting speaker. It is further preferred that the receiver includes an ultrasonic field receiving microphone, an ultrasonic field detector for detecting the presence of the transmitted field, and means for producing a received signal in response to the detected presence of the transmitted field. Also, there is a preferred embodiment of the present invention wherein the received signal is produced at a level that is directly related to the level of the received transmitted field. It is more preferred that the control circuit include a comparator circuit for comparing the level of the received signal to a predetermined level, and means for producing a control signal when the level of the received signal is less than the predetermined level or the control circuit includes a comparator circuit for comparing the level of the received signal to a predetermined level, and means for producing a control signal when the level of the received signal is greater than the predetermined level. In another embodiment of the present invention, the control circuit includes means for producing a control signal when the received signal is present.

In yet another embodiment of the present invention, the transmitter produces an electromagnetic field and an ultrasonic field. It is further preferred that the transmitter includes an electromagnetic field and an ultrasonic field. It is further preferred that the transmitter include an electromagnetic field generator, means for transmitting an electromagnetic field, an electromagnetic field transmitting antenna, an ultrasonic field generator, means for transmitting an ultrasonic field, and an ultrasonic field transmitting speaker. It is further preferred that the receiver includes an electromagnetic field receiving antenna, an electromagnetic field detector for detecting the presence of the transmitted electromagnetic field, means for producing a first received signal in response to the detected presence of the transmitted electromagnetic field, an ultrasonic field receiving microphone, an ultrasonic field detector for detecting the presence of the transmitted ultrasonic field, and means for producing a second received signal in response to the detected presence of the transmitted ultrasonic field. In such a preferred system, the control circuit includes, a comparator circuit for comparing the time between the receiver of the first received signal and the receipt of the second received signal, and means for producing a control signal when the time between the receipt of the first received signal and the receipt of the second received signal is less than a predetermined time or the control circuit includes a comparator circuit for comparing the time between the receipt of the first received signal and the receipt of the second received signal, and means for producing a control signal when the time between the receipt of the first received signal and the receipt of the second received signal is greater than the predetermined level.

BRIEF DESCRIPTION OF THE DRAWINGS

The above and other features and advantages of the invention will become further known from the following detailed description of preferred embodiments of the invention in conjunction with the drawings in which.

DETAILED DESCRIPTION OF THE DRAWINGS

Figure 1:
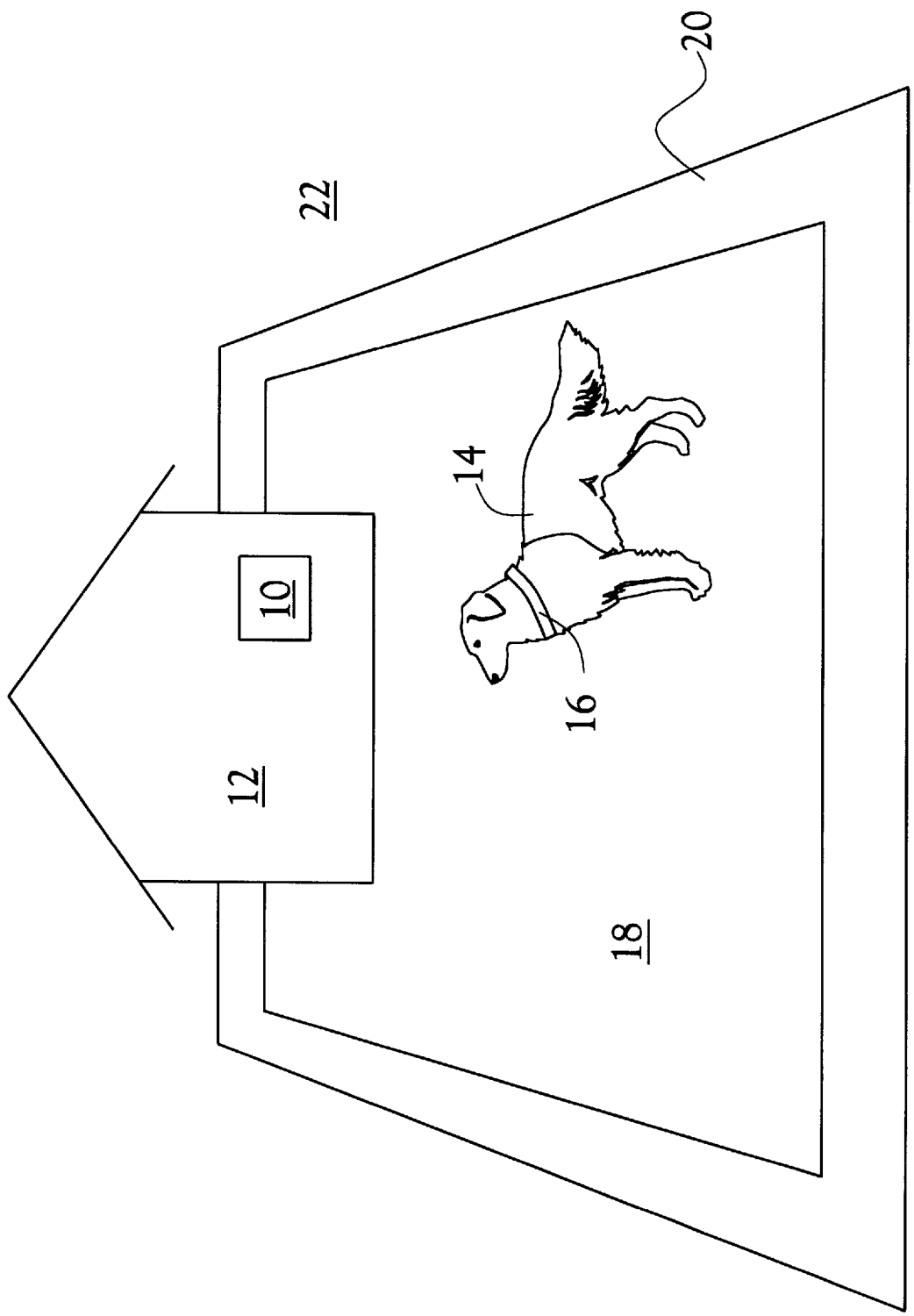
FIG. 1 is a block diagram representation of an embodiment of an animal control system according to the present invention.

Referring now to the drawings, FIG. 1 is a block diagram representation of an embodiment of an animal control system according to the present invention. A transmitter 10 is generally placed on or near a house 12 which is situated generally within the area to which the animal 14 is confined. The animal 14 wears a collar/receiver 16 which contains a stimulus system which releases a substance having an adverse effect upon the animal 14 if the animal 14 wanders too close to the boundaries of the system.

The safe area 18 comprises an area in which the animal 14 receives no stimuli from the collar/receiver 16. When the animal 14 moves in the warning area 20, the collar/receiver 16 gives a warning signal, in the nature of a sound or flashing light or other indication to the animal 14. When the animal 14 moves into the correction area 22, the collar/receiver 16 generates a control signal which triggers a release of a substance having an adverse effect upon the animal 14 to indicate to the animal 14 that it is in a correction area 22. Thus, the animal 14 is trained to remain within the safe area 18 but if the animal 14 moves in to the warning area 20 it will be warned to move back into the safe area 18.

Figure 2:
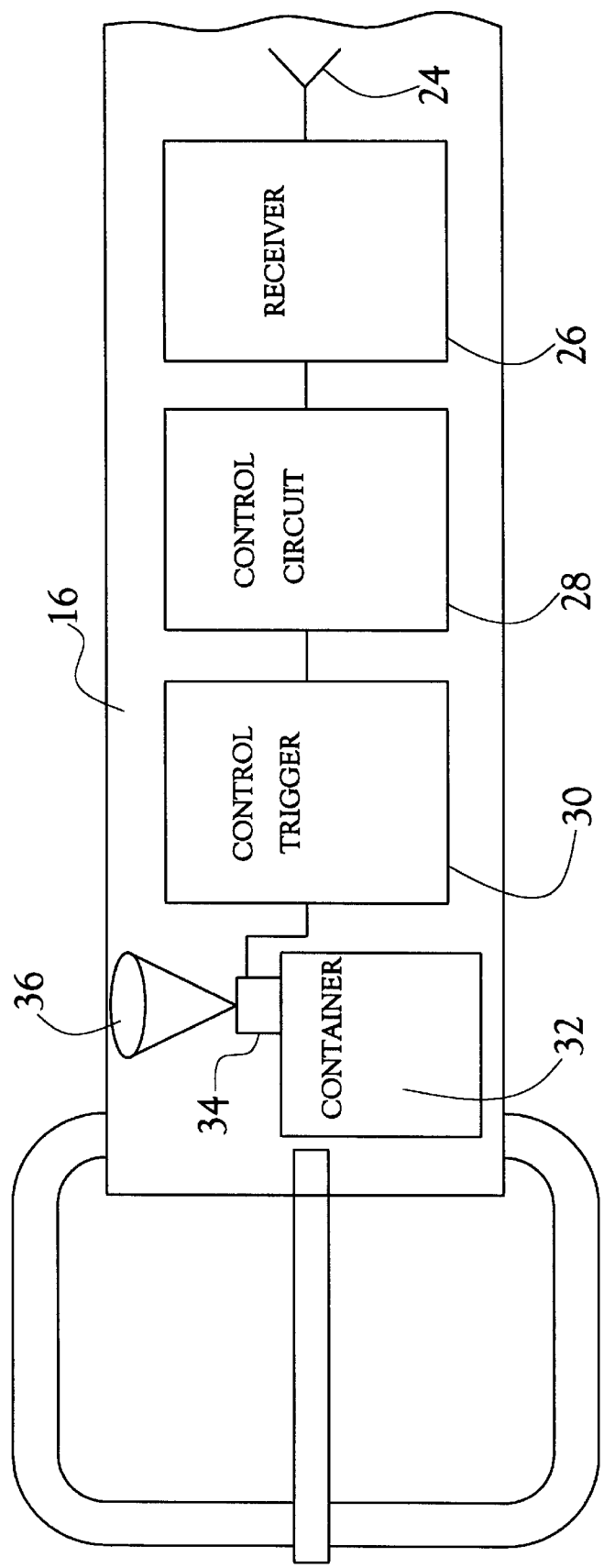
FIG. 2 is a schematic representation of a collar of an embodiment of an animal control system according to the present invention.

There is shown in FIG. 2 schematic representation of a collar 16 of an embodiment of an animal control system according to the present invention. The collar includes, for example, an antenna 24 which receives an electromagnetic field transmitted by the transmitter (not shown). In the use of the present invention with an ultrasonic system, the antenna 24 may be replaced by a microphone capable of receiving an ultrasonic field transmitted by the transmitter.

The signal from the antenna 24 is received by a receiver 26 where it is amplified into a received signal. The received signal is then passed to a control circuit 28 where it is analyzed to determine if the received signal warrants a correction. If a correction to the animal is warranted, the control circuit 28 sends a control signal to trigger circuit 30 which triggers the release of a substance having an adverse effect on the animal. The substance is contained in a container 32. The release of the substance is controlled by a valve 34 which is activated by a trigger signal from the trigger circuit 30. When released from the container 32, the substance having an adverse effect upon the animal is released from the nozzle 36 into the presence of the animal, usually in the vicinity of the neck of the animal.

The release of the substance having an adverse effect upon the animal generally causes some initial discomfort to the animal. Such a substance is citronella or other natural or synthetic substance which would cause mild discomfort to the animal. In general, the nozzle 36 of the collar 16 is aimed in the general direction of the mouth and/or eyes of the animal. Thus, the animal will be immediately aware of the release of the substance having an adverse effect upon the animal. Such a system is as effective as a system using an electric shock or high pitched tone but is much better tolerated by both the animal and the animal's owner.

Figure 3:
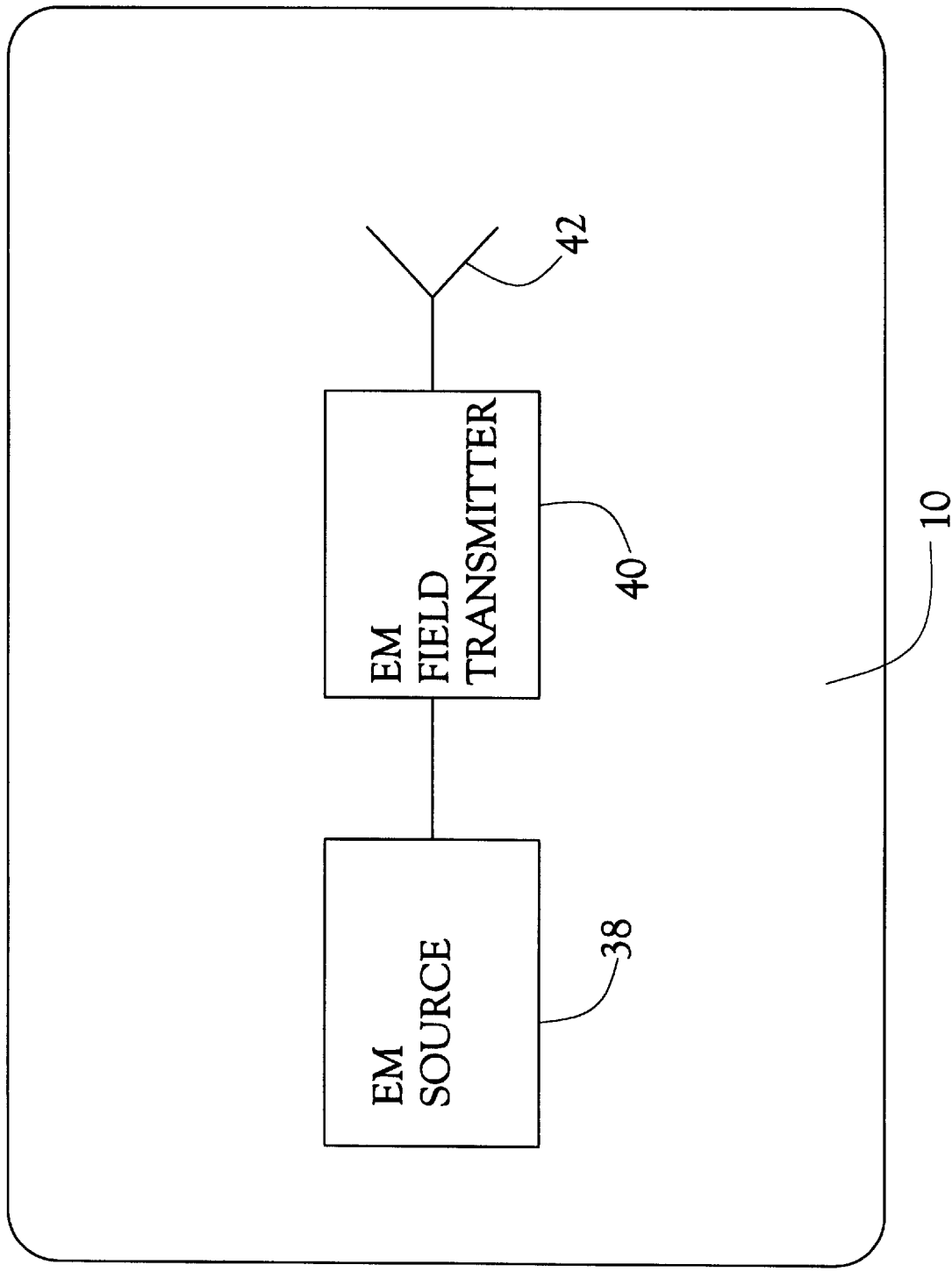
FIG. 3 is a block diagram representation of a generalized transmitter of an embodiment of an animal control system according to the present invention.

FIG. 3 is a block diagram representation of a generalized transmitter 10 of an embodiment of an animal control system according to the present invention. The transmitter 10 includes an electromagnetic (EM) frequency source 38 which generates an EM frequency signal suitable for the particular use desired. For use as an animal containment system, the frequency would range from about but not limited to 5 kHz to about 20 kHz. For use as an animal training system, the frequency would range from about but not limited to 200 MHZ to about 400 MHZ. The EM frequency source 38 feeds the EM frequency signal to an EM field transmitter 40. The signal is amplified and, perhaps, modulated and then sent to the transmitting antenna 42 for generating an electromagnetic field. Such a field may be a radio frequency (RF) field or a magnetic field. The transmitter 10 shown in the FIG. 3 represents a transmitter for use with an electromagnetic field. A transmitter to be used with an ultrasonic field would be similar but have the following substitutions: the EM frequency source 38 would be an ultrasonic frequency source and the transmitting antenna 42 would be an ultrasonic speaker. The field transmitter 40 would still amplify and, perhaps, modulate the ultrasonic frequency.

Figure 4:
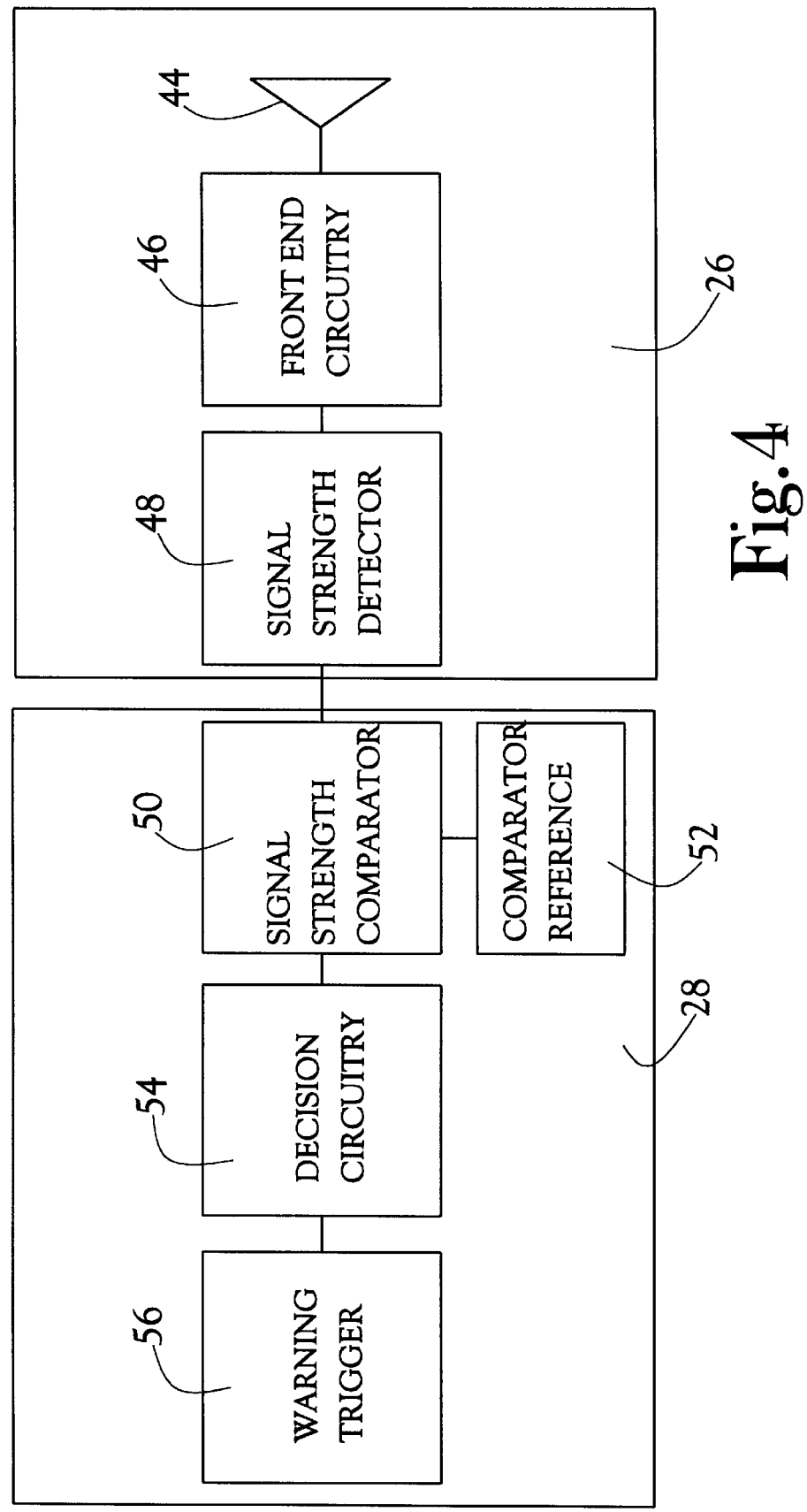
FIG. 4 is a block diagram representation of a receiver and control circuit of an embodiment of an animal control system according to the present invention wherein the transmitter transmits an electromagnetic field.

FIG. 4 is a block diagram representation of a receiver 26 and control circuit 28 in a collar 16 of an embodiment of an animal control system according to the present invention wherein the transmitter transmit an electromagnetic field. A receiving antenna 44 detects the electromagnetic field and sends an electromagnetic signal to the receiver front-end circuitry 46 in the receiver which amplifies the signal. The amplified signal is then sent to a signal strength detector 48 which generates a signal level that is proportional to the strength of the detected electromagnetic field.

The signal level is then sent to a signal strength comparator 50 in the control circuit 28. A referenced signal level is also sent to the signal strength comparator 50 from a comparator referenced 52. The signal strength comparator 50 compares the difference between the signal level and the referenced signal level and produces a comparison signal which is indicative of the relative strengths of the two levels. Thus, the comparison signal will indicate that the signal level is greater than, less than, or the same as the comparison signal level. The comparison signal is then sent to decision circuity 54 which produces a control system depending on the nature of the comparison signal. For example, if the animal control system is of the type which uses a buried wire to mark a boundary, then a control signal will be generated when the comparison signal indicates that the signal level is greater than the comparison signal level. If the animal control system is of the type which uses a free standing transmitter, then a control signal will be generated when the comparison signal indicates that the signal level is less than the comparison signal level. The control signal is then sent to the control trigger 30 for activation of a spray of the substance having an adverse effect on the animal. A warning signal may also be generated by the decision circuitry 54 for transmission to a warning trigger 56. Such a warning signal would generally be generated prior to the generation of the control signal and would provide the animal with a warning that it is approaching a boundary.

The representation shown in FIG. 4 is generally intended for use as an animal containment system and would be modified for use as an animal control system. The control circuit 28 would be reduced to decision circuitry 54 which would produce a control signal upon receipt of the signal level from the signal strength detector 48. Thus, the animal trainer would operate the transmitter to control the animal, the receive 26 would receive the signal, the control circuit 28 would generate a control signal and the control trigger 30 would trigger the release of a spray of the substance having an adverse effect on the animal.

Figure 5:
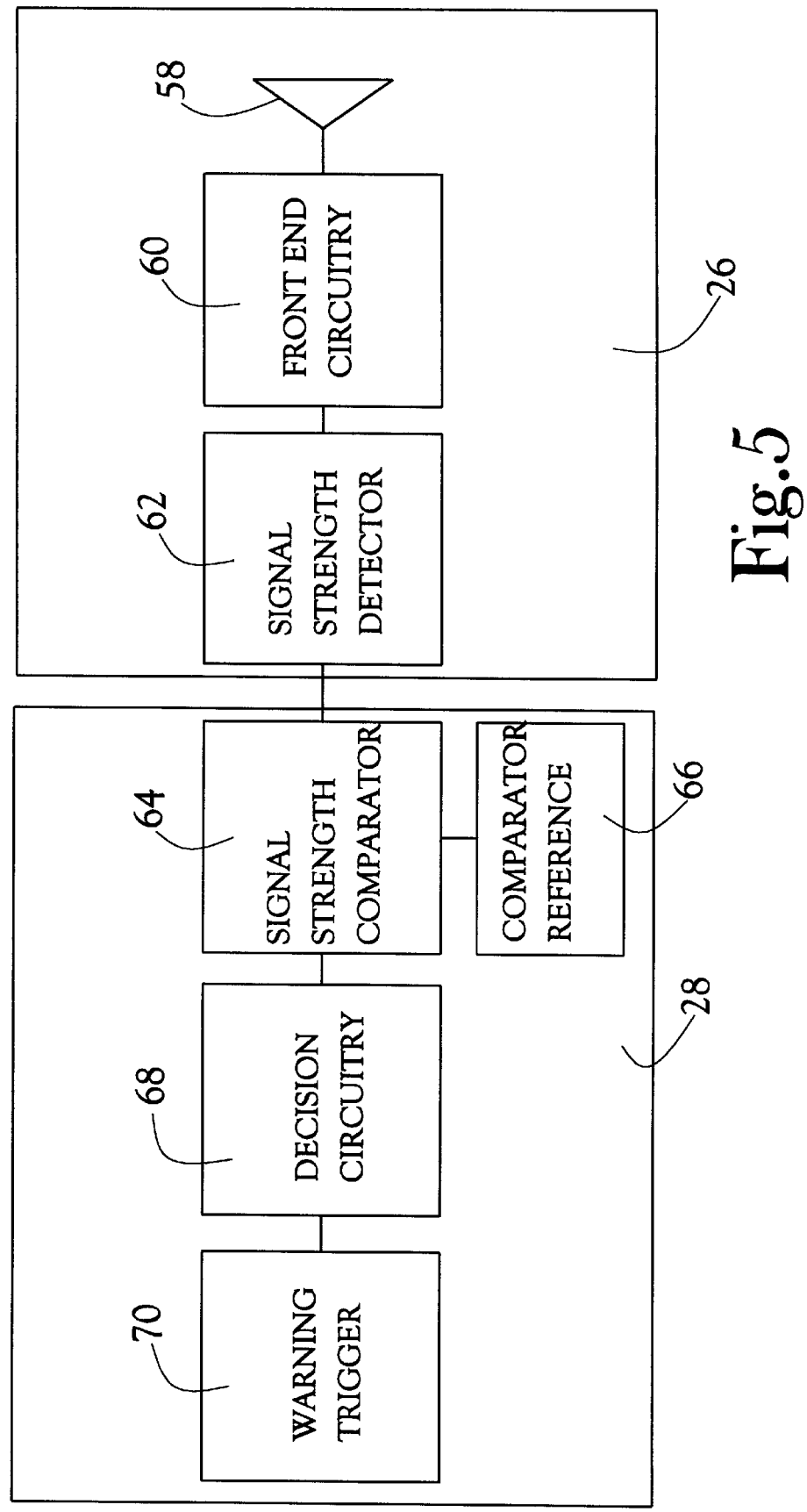
FIG. 5 is a block diagram representation of a receiver and control circuit of an embodiment of an animal control system according to the present invention wherein the transmitter transmits an ultrasonic field.

FIG. 5 is a block diagram representation of a receiver 26 and control circuit 28 of an embodiment of an animal control system according to the present invention wherein the transmitter transmit an ultrasonic field. A receiving microphone 58 detects the ultrasonic field and sends a signal to the receiver front-end circuitry 60 in the receiver which amplifies the signal. The amplified signal is then sent to a signal strength detector 62 which generates a signal level that is proportional to the strength of the detected ultrasonic field.

The signal level is then sent to a signal strength comparator 64 in the control circuit 28. A referenced signal level is also sent to the signal strength comparator 64 from a comparator reference 66. The signal strength comparator 64 compares the difference between the signal level and the reference signal level and produces a comparison signal which is indicative of the relative strengths of the two levels. Thus, the comparison signal will indicate that the signal level is greater than, less than, or the same as the comparison signal level. The comparison signal is then sent to decision circuitry 68 which produces a control signal depending on the nature of the comparison signal. For example, if the animal control system is of the type which uses a series of speakers to mark a boundary, then a control signal will be generated when the comparison signal indicates that the signal level is greater than the comparison signal level. If the animal control system is of the type which uses a free standing ultrasonic transmitter, then a control signal will be generated when the comparison signal indicates that the signal level is less than the comparison signal level. The control signal is then sent to the control trigger 30 for activation of a spray of the substance having an adverse effect on the animal. A warning signal may also be generated by the decision circuitry 68 for transmission to a warning trigger 70. Such a warning signal would generally be generated prior to the generation of the control signal and would provide the animal with a warning that it is approaching a boundary.

The representation shown in FIG. 5 is generally intended for use as an animal containment system and would be modified for use as an animal control system. The control circuit 28 would be reduced to decision circuitry 68 which would produce a control signal upon receipt of the signal level from the signal strength detector 62. Thus, the animal trainer would operate the transmitter to control the animal, the receiver 26 would receive the signal, the control circuit 28 would generate a control signal and the control trigger 30 would trigger the release of a spray of the substance having an adverse effect on the animal.

Figure 6:
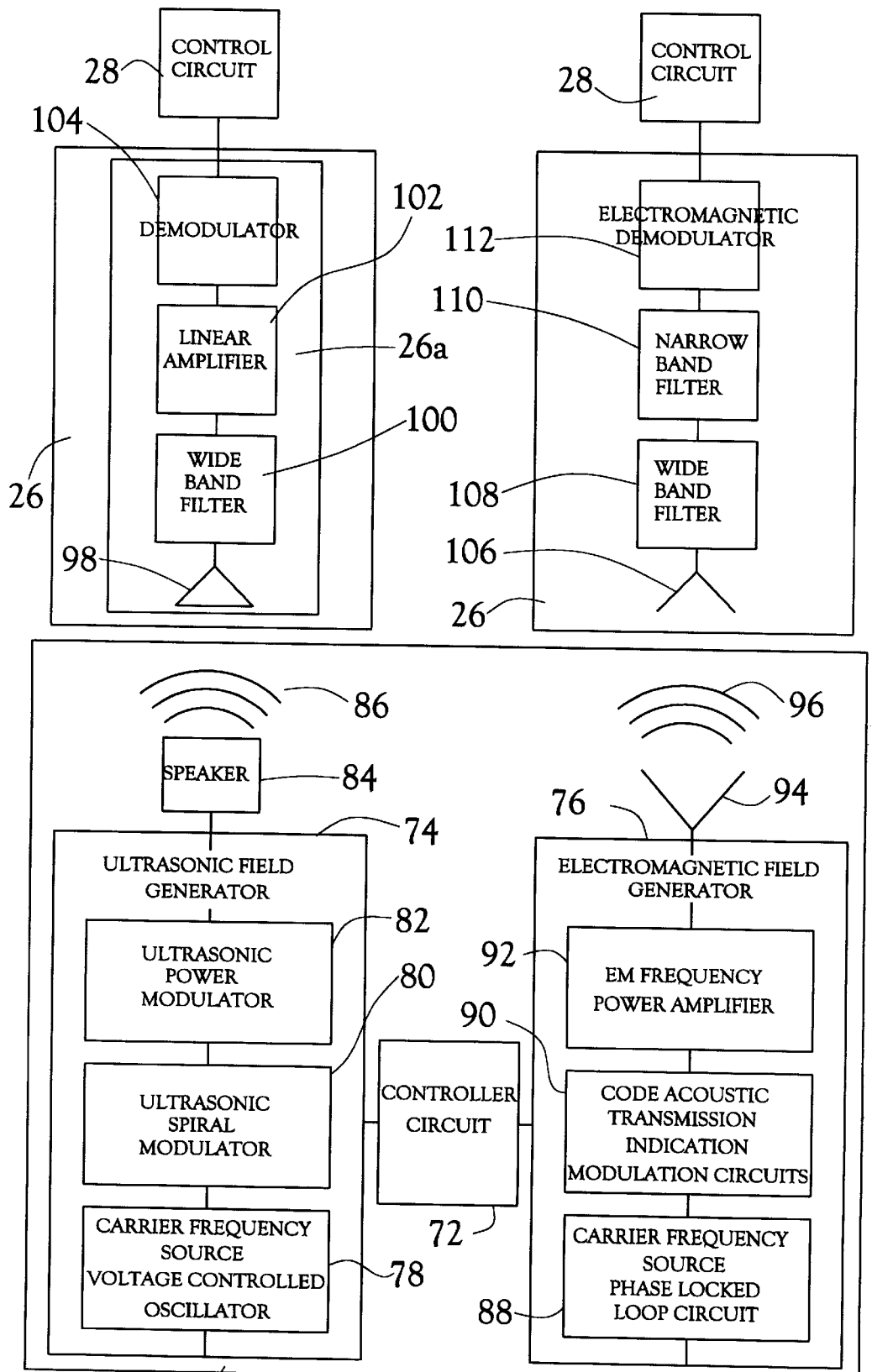
FIG. 6 is a block diagram representation of a receiver and control circuit of an embodiment of an animal control system according to the present invention wherein the transmitter transmit an electromagnetic field and an ultrasonic field.

FIG. 6 is a block diagram representation of a transmitter 10, receiver 26 and control circuit 28 of an embodiment of an animal control system according to the present invention wherein the transmitter transmits an electromagnetic field and an ultrasonic field. The system comprises a transmitter 10 and a collar 16. The transmitter 10 includes a controller circuit 72 which controls the signals from an ultrasonic field generator 74 and the electromagnetic field generator 76.

In the ultrasonic field generator 74, a carrier frequency source voltage controlled oscillator 78 provides the carrier ultrasonic frequency. An ultrasonic signal modulator 80 applies modulation to the signal from the voltage controlled oscillator 78 which is then sent to an ultrasonic power amplifier 82. The controller circuit 72 provides control inputs to the voltage controlled oscillator 78, the ultrasonic signal modulator 80 and the ultrasonic power amplifier 82. Upon a signal from the controller circuit 72, the power amplifier 82 sends a signal to the speaker 84 which emits an ultrasonic signal 86.

The speaker 84 may be any one of a number of acoustic transducers available, but it is preferred that the speaker 84 uses a piezo element used for high frequency ($\geq$5 kHz) speakers. The ultrasonic signal 86 preferably has a frequency in the range of from about 20 kHz to about 90 kHz. Ideally, the ultrasonic signal is somewhat above the highest frequency that can be detected by the animal. Therefore, a more preferred ultrasonic signal 86 frequency is in the range of from about 60 kHz to about 90 kHz.

In the electromagnetic field generator 76, a carrier frequency source phase locked loop circuit 88 provides an electromagnetic carrier frequency. A code and acoustic transmission indication modulation circuit 90 modulates the carrier frequency from the phase locked loop circuit 88. The modulated carrier frequency from the phase locked loop circuit 88 is sent to an electromagnetic frequency power amplifier 92. At a signal from the controller circuit 72, the power amplifier 92 sends a signal to an electromagnetic transmitting antenna 94 which then broadcasts an electromagnetic signal 96.

The electromagnetic transmitting antenna 94 may be any one of a number of elements familiar to the practitioner in the art. The structure and size of the antenna 94 is not important as long as an effective electromagnetic signal, as described hereinafter, is produced. A preferred carrier frequency of the electromagnetic signal 94 is in the range of from about 200 MHZ to about 400 MHZ with a most preferred carrier frequency of 303 MHZ.

The ultrasonic signal 86 is received at the collar 16, by an ultrasonic detector 98 which, in practice is an electric microphone or the like well known to practitioners in the art. The ultrasonic detector 98 sends the received ultrasonic signal to a wide band filter 100 to remove acoustic signals which are not within the preferred frequency range of the present invention. That is, the wide band filter 100 filters out acoustic signals which are outside the range of from about 20 kHz to about 90 kHz.

The output of the wide band filter 100 is then sent to a linear amplifier 102 and a demodulator 104. The demodulator 104 is then sent to a controller/analyzer circuit 28. The entire ultrasonic receiver 26a, comprising the ultrasonic detector 98, the wide band filter 100, the linear amplifier 102 and the demodulator 104, may be found on a single circuit such as the MC3373 remote control wide band amplifier with detector produced by MOTOROLA.

The output of the wide band filter 100 is then sent to a linear amplifier 102 and a demodulator 104. The demodulated signal from the demodulator 104 is then sent to a controller/analyzer circuit 28. the entire ultrasonic receiver 26a, comprising the ultrasonic detector 98, the wide band filter 100, the linear amplifier 102 and the demodulator 104, may be found on a single circuit such as the MC3373 remote control wide band amplifier with detector produced by MOTOROLA.

In a manner similar to the processing of the ultrasonic signal 86, the electromagnetic signal 96 is received at the collar 16 by a receiving antenna 106 which sends the received electromagnetic signal to a wide band filter 108 to remove electromagnetic signals which are not within the frequency range of the present invention. The filtered electromagnetic signal is then sent to a narrow band filter 110 which further filters out unwanted electromagnetic signals. Then the filtered electromagnetic signal is sent to an electromagnetic demodulator 112. The demodulated electromagnetic signal is then sent from the demodulator 112 to the controller/analyzer circuit 28.

The speed of electromagnetic propagation is equal to that of light at $3\times10^8$ meters/second. Therefore, the transmission delay for an electromagnetic signal is $3.33\times10^9$ seconds/meter or about $3.33\times10^{-7}$ seconds for a pet containment area with a radius of 100 meters. Ultrasonic signal propagation is equal to that of the speed of sound at 331.6 meters/second.

Therefore, the transmission delay for an ultrasonic signal is $3.01 \times 10^{-3}$ seconds/meter or about $3.01 \times 10^{-1}$ seconds for the same pet containment area with a radius of 100 meters. Thus, the electromagnetic signal propagates about a million times faster than the ultrasonic signal. Compared with the ultrasonic transmission delay, the electromagnetic transmissions are substantially instantaneous. Therefore, the electromagnetic signal is used to indicate the initiation of the ultrasonic transmission at the receiver, allowing the receiver to measure the time delay for the ultrasonic signal reception.

During the operation of the present invention, if $\Delta t$ is less than a first predetermined value, $t_1$, then the controller/analyzer circuit 28 continues to monitor the value of $\Delta t$. If $\Delta t$ is greater than $t_1$, and less than a second predetermined value, $t_2$, then the controller/analyzer circuit 28 sends a signal to a warning device, such as the speaker 114, which sends a warning signal 116 to the animal. Usually, the warning signal 116 is high pitched tone which is recognized by the pet as indicating that the pet is in a warning zone and will need to return to an area where the warning signal 116 is not heard.

If $\Delta t$ is greater than $t_2$ then the controller/analyzer circuit 28 sends a control signal to a control device 30 which triggers the release of a spray of the substance having an adverse effect on the animal.

During normal operation of the system according to the present invention, the ultrasonic 86 and the electromagnetic signal 96 may be modulated in order to allow collar 16 to separate the signals 86 and 96 from random environmental signals. Thus, the modulating units 80 and 90 are incorporated into the ultrasonic field generator 74 and the electromagnetic field generator 76 and the demodulating units 104 and 112 are likewise incorporated into the collar 16.

In the practice of the present invention, the controller 72 of the transmitter 10 organizes the electromagnetic signal 96 and the ultrasonic signal 86 and encodes a permission range on the signal to the speaker 84. Rather than using a single speaker 84, a plurality of speakers may be used in the transmitter 10 to extend the range of the system.

Thus, the present invention provides a pet control system which does not use an electric shock or high pitched sounds as a corrective measure. Further, the present invention provides a pet control system which does not use so much power as to inconveniently require frequent recharging or replacement of batteries in the pet's collar.

Having thus described various preferred embodiments of the invention and several of its benefits and advantages, it will be understood by those of ordinary skill that the foregoing description is merely for the purpose of illustration and that numerous substitutions, rearrangements and modifications may be made in the invention without departing from the cope and spirit of the appended claims.

The appended claims set forth various novel and useful features of the invention.

What is claimed is:

1. An apparatus for controlling an animal, wherein the animal receives a control stimulus of the release of a substance having an adverse effect upon the animal as a corrective measure, the apparatus comprising:
   a transmitter for producing a transmitted field; and
   a releasable collar for attaching to the neck of the animal, the collar further including:
   a receiver for receiving the transmitted field and for producing a received signal;
   a control circuit for determining when the received signal indicates that the animal requires a corrective measure and for producing a control signal;
   a container for containing the substance having an adverse effect upon the animal; and
   means for releasing the substance from the container into the presence of the animal upon the production of the control signal by the control circuit;
   wherein the transmitter produces the transmitted field, the collar is attached to the animal, the receiver in the collar receives the transmitted field and produces a received signal, the control circuit determines when the received signal indicates that the animal requires a corrective measure, a control signal is produced by the control circuit when the determination is made that the animal requires a corrective measure, and upon the production of the control signal, the substance having an adverse effect upon the animal is released from the container and into the presence of the animal.

2. The apparatus of claim 1 wherein the transmitter produces an electromagnetic field.

3. The apparatus of claim 2 wherein the transmitter produces a magnetic field.

4. The apparatus of claim 2 wherein the transmitter includes:
   an electromagnetic field generator;
   means for transmitting an electromagnetic field; and
   an electromagnetic field transmitting antenna.

5. The apparatus of claim 2 wherein the receiver includes:
   an electromagnetic field receiving antenna;
   an electromagnetic field detector for detecting the presence of the transmitted field; and
   means for producing a received signal in response to the detected presence of the transmitted field.

6. The apparatus of claim 5 wherein the received signal is produced at a level that is directly related to the level of the received transmitted field.

7. The apparatus of claim 6 wherein the control circuit includes:
   a comparator circuit for comparing the level of the received signal to a predetermined level; and
   means for producing a control signal when the level of the received signal is less than the predetermined level.

8. The apparatus of claim 6 wherein the control circuit includes:
   a comparator circuit for comparing the level of the received signal to a predetermined level; and
   means for producing a control signal when the level of the received signal is greater than the predetermined level.

9. The apparatus of claim 5 wherein the control circuit includes means for producing a control signal when the received signal is present.

10. The apparatus of claim 9 wherein the receiver includes:
    an ultrasonic field receiving microphone;
    an ultrasonic field detector for detecting the presence of the transmitted field; and
    means for producing a received signal in response to the detected presence of the transmitted field.

11. The apparatus of claim 10 wherein the received signal is produced at a level that is directly related to the level of the received transmitted field.

12. The apparatus of claim 11 wherein the control circuit includes:
    a comparator circuit for comparing the level of the received signal to a predetermined level; and
    means for producing a control signal when the level of the received signal is less than the predetermined level.

13. The apparatus of claim 11 wherein the control circuit includes:

a comparator circuit for comparing the level of the received signal to a predetermined level; and means for producing a control signal when the level of the received signal is greater than the predetermined level.

14. The apparatus of claim 10 wherein the control circuit includes means for producing a control signal when the received signal is present.

15. The apparatus of claim 1 wherein the transmitter produces an ultrasonic field.

16. The apparatus of claim 15 wherein the transmitter includes:

an ultrasonic field generator;

means for transmitting an ultrasonic field; and an ultrasonic field transmitting speaker.

17. The apparatus of claim 1 wherein the transmitter produces an electromagnetic field and an ultrasonic field.

18. The apparatus of claim 17 wherein the transmitter includes:

an electromagnetic field generator;

means for transmitting an electromagnetic field;

an electromagnetic field transmitting antenna;

an ultrasonic field generator;

means for transmitting an ultrasonic field; and an ultrasonic field transmitting speaker.

19. The apparatus of claim 18 wherein the receiver includes;

an electromagnetic field receiving antenna;

an electromagnetic field detector for detecting the presence of the transmitted electromagnetic field;

means for producing a first received signal in response to the detected presence of the transmitted electromagnetic field;

an ultrasonic field receiving microphone;

an ultrasonic field detector for detecting the presence of the transmitted ultrasonic field; and means for producing a second received signal in response to the detected presence of the transmitted ultrasonic field.

20. The apparatus of claim 19 wherein the control circuit includes:

a comparator circuit for comparing the time between the receipt of the first received signal and the receipt of the second received signal; and means for producing a control signal when the time between the receipt of the first received signal and the receipt of the second received signal is less than a predetermined time.

21. The apparatus of claim 19 wherein the control circuit includes;

a comparator circuit for comparing the time between the receipt of the first received signal and the receipt of the second received signal; and means for producing a control signal when the time between the receipt of the first received signal and the receipt of the second received signal is greater than the predetermined level.

* * * * *